United States Patent [19]

Keith

[11] 4,047,862
[45] Sept. 13, 1977

[54] CELLULOSE ESTER FIBRILLAR STRUCTURE

[75] Inventor: Charles Herbert Keith, Charlotte, N.C.

[73] Assignee: Celanese Corporation, New York, N.Y.

[21] Appl. No.: 638,242

[22] Filed: Dec. 8, 1975

Related U.S. Application Data

[63] Continuation of Ser. No. 409,197, Oct. 24, 1975, abandoned.

[51] Int. Cl.² .............................................. B29C 23/00
[52] U.S. Cl. .................................... 425/8; 264/8; 264/184
[58] Field of Search .......................... 425/6, 8, 10, 67; 264/184, 8, 14, 5

[56] References Cited

U.S. PATENT DOCUMENTS

| | | | |
|---|---|---|---|
| 1,500,930 | 7/1924 | Hooper | 425/67 |
| 1,500,931 | 7/1924 | Hooper | 425/67 |
| 1,500,932 | 7/1924 | Hooper | 425/67 |
| 2,217,235 | 10/1940 | Rieser | 425/8 X |
| 2,299,929 | 10/1942 | Roynolds, Jr. | 425/8 X |
| 2,495,147 | 1/1950 | Street | 264/8 |
| 3,001,242 | 9/1961 | Heffelfinger | 425/67 X |
| 3,272,893 | 9/1966 | Mogensen | 425/8 X |
| 3,285,722 | 11/1966 | Leveeque et al. | 425/8 X |
| 3,928,009 | 12/1975 | Perry | 425/8 X |

Primary Examiner—Robert L. Spicer, Jr.
Attorney, Agent, or Firm—Roderick B. Macleod

[57] ABSTRACT

Cellulose ester fibrillar material is produced by forming a cellulose ester dope, pumping the dope to an extrusion orifice, extruding the dope through the orifice into a region of shear and high draw in a precipitation bath containing a non-solvent for said cellulose ester maintained at an elevated temperature. The fibrillar material is preferably subjected to further treatment to reduce the particle size and set the structure by expanding voids and expelling residual solvent. Paper having a high degree of opacity is produced by incorporating the cellulose ester material to obtain light weight paper.

5 Claims, 3 Drawing Figures

CELLULOSE ESTER FIBRILLAR STRUCTURE

This is a continuation of application Ser. No. 409,197, filed Oct. 24, 1975, now abandoned.

BACKGROUND OF THE INVENTION

This invention relates to a process for producing short fibrillar cellulose ester material (termed fibrets) for use as a replacement for clay and titanium dioxide in paper opacification. The process is also applicable to the production of other short length cellulose ester fibrillar structures such as flake, rough surface staple fibers and pulp suitable for the formation of a cellulose ester paper sheet for use in the production of tobacco smoke and other filters. Cellulose ester fibrets can be used to replace the normal high opacity paper fillers, such as clay and titanium dioxide, with a high retention of the filler in the paper making process and without significant deterioration in paper strength, making it possible to produce lower weight basis paper of substantially equal opacity and strength.

High opacity fillers make paper opaque by refracting and reflecting light rays striking the paper sheet. The light rays are refracted when there is a difference in the refractive indices between air and the paper filler. A solid material with a high index of refraction, such as titanium dioxide, can thus increase the opacity of paper when in admixture with the base cellulose paper fibers. However, the very small particle size and granular shape of such fillers leads to a reduction in sheet strength proportional to the amount included. Alternatively, a material of lower refractive index can provide an equal opacification effect by having an extensive void structure characterized by a high specific surface area. Light reflected and refracted in passing into and through the numerous voids is thoroughly scattered and imparts an opaque appearance to the material.

The fibrillar nature of the filler of this invention permits an intimate incorporation of the filler with the base cellulose paper fibers and a frictional or entanglement bonding therewith. The sheet strength is thus maintained at a higher level than that found for equal amounts of granular fillers.

The production of one type of cellulose ester fibrous filler is described in U.S. Pat. Nos. 3,342,991 and 3,441,473. This process consists of air spraying a dilute dope of the cellulose ester into the atmosphere and then into a quench bath of water. Similar cellulose ester fibers are disclosed in U.S. Pat. No. 2,988,469. In that process, cellulose acetate dope is extruded into a high velocity, unidirectional, free flowing jet stream to produced fibers without the formation of shot.

Alternatively, high surface area fibrillar materials obtained from wholly synthetic polymers are described in U.S. Pat. Nos. 2,988,782 and 2,999,788. These are produced by processes characterized by a rapid precipitation of a polymer in a region of high shear. Conversely, the process of the present invention is characterized by a rapid diffusional precipitation of a dissolved cellulose ester polymer in a region of draw sufficient to rupture the partially formed filaments. It is further characterized by a shear rate substantially lower than that of the prior art.

The trend in the paper industry toward light weight papers has necessitated finding a means for maintaining, in light weight sheets, optical properties normally found in heavier weight papers. The utilization of such conventional fillers as clay and titanium dioxide, in greater amounts to achieve the desired optical properties results in a deterioration of the strength of such light weight papers, thus severely limiting their usefulness. The use of cellulose ester fibrets produced by the process of this invention, provides a vehicle for obtaining high opacity light weight papers, with 90 percent or more retention of the fibrets in the paper making process and without serious deterioration of paper strength.

OBJECTS OF THE INVENTION

It is an object of the present invention to produce cellulose ester fibrets which are useful as fillers in high opacity papers, with high retention during the paper making process.

It is another object of the present invention to provide a novel method for the production of cellulose ester fibrets by the centrifugal spinning of a cellulose dope directly into an area of high draw in a precipitation bath.

It is still another object of the present invention to provide a process for the production of high opacity, light weight papers by the incorporation therein of cellulose ester fibrets produced by the novel centrifugal spinning process of the present invention.

STATEMENT OF THE INVENTION

In accordance with the present invention, there is provided a process comprising: (1) forming a cellulose ester dope, the dope preferably containing from about 5 to 15 percent by weight cellulose ester, in a solvent containing from about 2 to 20 percent by weight of a non-solvent liquid which is miscible with the solvent for the cellulose ester and from about 80 to 98 percent by weight of a solvent for the cellulose ester which is miscible with the non-solvent; (2) passing the cellulose ester dope by any suitable means, such as by pumping through a rotary union, to the extrusion orifice; (3) positioning a substantially cylindrical disk which is rotating about its axis in a heated precipitation bath, the bath consisting essentially of a non-solvent for the cellulose ester and up to 10 percent by weight of an organic solvent which is miscible with said non-solvent; (4) maintaining the precipitation bath at a temperature of from about 60° centigrade to a temperature below the boiling point of the non-solvent therein, preferably a temperature of up to about 95° centigrade; (5) pumping additional liquid corresponding substantially in composition with the composition of the precipitation bath into the precipitation bath and past the periphery of the rotating disk at a flow rate of at least 0.5 liter per minute per extrusion orifice, preferably at least 1.0 liter per minute; (6) extruding the dope through one or more orifices or capillary needles positioned on the periphery of the rotating disk, or alternatively, positioning a wall or plate around the periphery of the rotating disk and, optionally extruding the dope from orifices positioned on the wall or on the periphery of the disk into the precipitation bath, the extrusion orifice or orifices having a diameter ranging from 0.005 to 0.040 inch; (7) precipitating the cellulose ester dope in the precipitation bath and removing the precipitate from the bath; (8) homogenizing the cellulose ester precipitate and reducing the particle size of the precipitated cellulose ester fibrets; (9) subjecting the homogenized fibrets to boiling, preferably in water, for at least 5 minutes, preferably from 10 to 30 minutes, to aid in removing residual organic solvent, and to expand and set the voidy fibrillar structure; and (10) the cellulose ester fibrets may optionally be subjected to a drying operation for more convenient shipment and subsequent use.

The invention also comprises an apparatus for the production of an opaque, voidy, fibrillar structure which comprises a precipitation tank containing a precipitation bath; a substantially cylindrical disk submerged in said bath; means for rotating said disk in said precipitation bath; one or more extrusion orifices positioned near the periphery of said disk; means for pumping additional precipitation bath into the precipitation tank and past the periphery of the rotating disk at a flow rate of at least 0.5 liter per minute per extrusion orifice; means for removing the cellulose ester fibrillar structure after precipitation, from the tank; and means for homogenizing the precipitated cellulose ester fibrillar structure.

The process and apparatus described provides for a dope which facilitates the production of a rapidly precipitating, voidy, high surface area, opaque, fibrillar material and provides shear and a high draw rate during formation to break up and fibrillate the product. The dope extruded out of the orifices directly into the precipitation bath is precipitated and drawn and sheared with the aid of the large velocity gradient in the vicinity of the orifices. Because a relatively large number of such small diameter orifices could be included on the periphery of a single disk, a very significant increase in productivity over the prior art processes can be achieved, as a simple calculation will demonstrate. If a 6 inch diameter disk spinning at 2900 revolutions per minute is utilized, with 100 peripherally located 0.014 inch diameter orifices which are fed with a 7 percent by weight dope solution at a flow rate of 65 grams per minute per orifice, the production rate of the cellulose ester fibrets would be 60 pounds per hour.

Spraying nozzles are notorious for their tendency toward clogging. Pressurized air supplies, which are expensive, are also eliminated by the process of the present invention. Thus, the process is not only greatly simplified, but the high productivity contributes to considerable savings in equipment and raw material costs per pound of product produced. The process of this invention also provides for the possibility of producing a range of products which can be controllably produced by varying the operating conditions, such as the dope pumping rate, the peripheral speed of the rotating disk, the dope composition and concentration, and the characteristics of the precipitation bath. By proper choice of dope composition and flow rate, disk speed, precipitation bath replenishment flow rate and jet orifice size, a combined high drawing and relatively low shearing force is imparted to the extruding and precipitating dope, which breaks up the dope stream after the fibrous structure reaches a certain length, resulting in a fibrillated staple product. After precipitation of the fibrillar product, called fibrets, the material is subjected to further treatment to reduce the fiber size and set the voidy structure by further expanding the voids which were formed earlier and expelling residual solvent. These effects are preferably achieved by subjecting the fibrets to a homogenizing action followed by subjecting them to boiling, such as in a distillation column. Under the preferred conditions, the boiling step is performed at elevated pressures to achieve elevated temperatures, preferably from above 100° to 130° centigrade.

The dope formulation contains a cellulose ester, such as cellulose acetate, cellulose triacetate, cellulose acetate butyrate, benzyl cellulose, or mixtures thereof. The preferred fibrets are produced from cellulose acetate or cellulose acetate butyrate dissolved in a solvent comprising two miscible components: an organic solvent such as acetone, methyl ethyl ketone, acetaldehyde or ethyl acetate and a liquid non-solvent for the cellulose ester such as water, methanol or ethanol. The liquid non-solvent makes up from about 2 to 20 percent by weight of the solvent mixture. The preferred organic solvent is acetone which is miscible with the preferred non-solvent, which is water. The concentration of cellulose ester in the solvent mixture should be from about 5 to 15 percent by weight, preferably from about 5 to 8 percent. Below about a 5 percent cellulose ester level, the opacity of the fibrets produced does not increase significantly and there is present more organic solvent than is necessary. Because the organic solvent flashes off during the process and can cause obvious problems because of difficulties in solvent recovery and the presence of a flammable, volatile solvent in the atmosphere, it is desirable to keep the organic solvent level as low as possible and still produce the desired product. At a cellulose ester level of over about 15 percent by weight, the level of opacity of the fibrets produced decreases. In fact, opacity begins to level off and decrease somewhat at levels over about 8 percent. In addition, keeping the dope solids level relatively low provides a dope which also has a relatively low viscosity and is much easier to handle and extrude without significant clogging of the extrusion orifices.

The dope is pumped by any suitable pump to the extrusion orifice or orifices, which are submerged in the precipitation bath. A cylindrical disk is also submerged in the bath and is rotated about its axis by a suitable drive means. A wall or plate is preferably positioned around the periphery of the rotating disk. A draw is exerted on the cellulose ester filament as it is extruded and passes from the periphery of the rotating disk into a region of relatively stationary precipitation fluid. This draw force is created by the difference between the peripheral velocity of the disk and the velocity at which the dope stream is being extruded, since the end of the filament in the relatively stationary precipitation fluid is essentially fixed by drag forces and the extrusion orifice is moving away from that point at the periphery of the disk. This draw is accentuated if a wall is positioned around the disk, because the cellulose ester then passes through the relatively narrow annulus between the periphery of the rotating disk and the relatively stationary fluid in the vicinity of the wall. If the width of the annulus is too narrow, there is a significant chance that there could be clogging of either the annulus or the extrusion orifices which extrude directly into the annulus. If the annular ring or wall is not present or is at too great a distance from the periphery of the disk, there will be a lower draw force exerted on the cellulose ester precipitate, as the precipitation bath tends to rotate with the rotating disk, and there will be a tendency for the fibers to be longer and the material to be less opaque. According to the preferred process, the dope is extruded into the annulus which measures from about 1/16 to ½ inch from the annular wall to the peripheral surface of the disk. For optimum results, the distance should be from about 1/16 inch to ¼ inch.

In the preferred process, the dope is extruded into the annulus between the rotating disk and the wall surrounding the disk. A substantially hollow disk may be utilized, with extrusion orifices positioned on the periphery of the disk. Dope is pumped into the hollow rotating disk, such as by pumping the dope through a rotary union into a hollow shaft connected to and serving to rotate the disk. The dope is extruded directly into the precipitation bath, wherein the cellulose ester precipitates and is ruptured by draw forces and the drag of the precipitant into short fibrillar structures. Alternatively, the dope may be extruded through orifices or capillary needles positioned on the annular wall surrounding the disk. This does away with the necessity for a hollow disk and somewhat simplifies the pumping of the dope to the extrusion orifices. However, it eliminates the centrifugal force on the dope as it is extruded and the movement of the extrusion orifices, thereby reducing the draw on the fibers. This also somewhat increases the tendency for clogging of the extrusion orifices because a non-moving orifice is not self-cleaning.

In addition to the draw force exerted on the precipitate as it passes through the annulus between the rotating disk and the wall surrounding the disk, there is a centrifugal force exerted on the dope as it is being extruded through a relatively narrow moving orifice. There is also an imposed pressure, preferably from about 10 to 60 pounds per square inch, because of the throughput force of the pump on the dope. The throughput of the dope is preferably maintained at a rate of from about 0.4 to 1.0 pounds of cellulose ester per hour per extrusion orifice. The diameter of the extrusion orifice or orifices should be from about 0.005 to 0.040 inch, most preferably from about 0.010 to 0.015 inch for optimum results. At a diameter of less than 0.005 inch, the throughput of the dope drops off and the cellulose ester precipitate appears to be less opaque. If the diameter is greater than 0.040 inch, the opacity remains acceptable, but the precipitate is too coarse and will produce paper which is too coarse or rough.

The disk is rotated at a relatively high speed to provide a centrifugal force on the dope as it is being extruded and to contribute to the draw exerted on the precipitating dope. The disk is rotated at a peripheral speed of at least 500 meters per minute, preferably at least 1000 meters per minute, and most preferably from about 1200 to 1800 meters per minute.

The cellulose ester dope is extruded directly into a precipitation bath. The bath comprises a non-solvent for the cellulose ester, such as water, methanol or ethanol and up to 10 percent by weight of an organic solvent which is miscible with the non-solvent such as acetone, methyl ethyl ketone, acetaldehyde or ethyl acetate. The bath is maintained at a temperature of from about 60° centigrade to just below the boiling point of the non-solvent, preferably at a temperature of up to about 95° centigrade. More non-solvent, preferably approximating the composition of the precipitation bath, is pumped, at this temperature, into the precipitation bath, preferably from the bottom thereof in a direction which is about perpendicular to the direction of extrusion of the cellulose ester dope. The flowing non-solvent serves to float the precipitate out of the precipitation bath into a suitable collection device. In order to ensure that the precipitate does float out of the bath and does not remain in the vessel containing the bath, where it can cause clogging, the non-solvent should flow into the bath and past the periphery of the rotating disk at a rate of at least 0.5 liter of water per minute per extrusion orifice. As a practical limit, the non-solvent (which is as previously mentioned, preferably water and will be described as such in the description of the preferred embodiments) can flow into the bath at a rate as high as 10 liters per minute per extrusion orifice. The water flow rate is much more critical at the higher limits of the temperature range of the precipitation bath. At these higher temperatures, e.g. about 95° centigrade, the fiber structure tends to set up faster and can cause clogging of the extrusion orifices much more easily if the precipitate is allowed to remain too long in the precipitation bath. As the temperature increases, fibrillation of the cellulose ester precipitate increases, the length of the fibrous structure decreases and more organic solvent is flashed off. As the temperature decreases, fibrillation decreases and the length of the fibrillar structure increases.

When the cellulose ester precipitate is removed from the heated precipitation bath, the cellulose ester fibrillar particles make up only a small part of the material, e.g. from about 0.1 to 1.0 percent by weight, with the remainder being water and residual organic solvent which was not flashed off during extrusion. The fibrillar structure is rather limp at this point with a relatively short fiber length, e.g. an average fiber length of from about 40 to 1000 microns and a relatively small diameter, e.g. from about 1 to 100 microns. The size of the fibers may be reduced to provide a material which is easily uniformly redispersed and the level of residual solvents reduced before the cellulose acetate fibrets are in a form which is to be used. Homogenizers utilizing high pressure orifices may be utilized for the purpose of reducing fiber size. The fibrets are passed through a homogenizer, of any suitable type, to reduce fiber size, so that the average length of the fibers is much smaller, e.g. from about 100 or less to 300 microns, and the diameter is also somewhat reduced, e.g. to an average size of from about 0.5 to 50 microns. At this point, the fibrets still comprise only a small portion of the material, usually as low as 0.5 to 1.5 percent by weight.

The fibrets are subjected to a heat treatment to remove the residual organic solvent, increase the size and number of the voids within the structure, set up the fibrillar structure, and harden and expand the fibrets. If substantially all of the organic solvent were not removed, it could act as a plasticizer in the theoretically dry material and cause clumps and lumps in the final product, making it much more difficult to redisperse in a uniform manner. In addition, upon exposure of the final product to heat, the fibrillar structure could be at least partially destroyed. However, it may be desirable under certain circumstances to add a plasticizer or other additive to the dope. This aids in the production of a lighter material with substantially the same opacity. Plasticizers or other bonding agents can also aid in increasing sheet strength of the paper produced.

The fibrets, with their residual water and organic solvent are boiled for at least 5 minutes, preferably from about 10 to 30 minutes, or passed through a distillation column for a like period of time. In the distillation column, the organic solvent will vaporize and rise to the top of the column and the wet cellulose fibrets will settle to the bottom. Under the preferred conditions, the boiling or distillation procedure is performed at elevated pressures to achieve elevated temperatures, preferably from above 100° to 130° centigrade. The fibrets now have a set, relatively stable, voidy, fibrous structure with a textured surface, but the material still has an extremely high water content. Water still usually comprises over 95 percent by weight of the material. However, the exact water content is dictated by the process conditions.

The water content should usually be reduced to a level where it is practical to ship the material for later redispersion and use. Any of the well known methods for reducing the solvent content of fibrillar materials may be utilized. A press which squeezes out water may be used to adjust the water content to about 10 to 50 percent by weight in a form, such as a cake, which can readily be redispersed for later use. Alternatively, the wet uncompacted cellulose ester fibrets may be passed through a dryer, wherein the high temperature will serve to remove substantially all of the residual water. If desired, the dried fibrets may be pressed into bales or pellets for later shipment and use. If the organic solvent level is no more than about 0.1 percent by weight in the final product, the material will not form clumps or lumps and will be readily redispersible.

The fibrets which are produced have, in addition to a high opacity, an extremely large surface area per unit of weight. Ordinary cellulose acetate acetate filaments have surface areas of about 0.25 square meters per gram and cellulose paper has a surface area of from about 1 to 2 square meters per gram. The cellulose ester fibrets produced by the process of the present invention have surface areas in the range of from about 12 to 18 square meters per gram in most instances, but substantially always have surface areas of greater than 5.0 square meters per gram. This provides a material which is readily adaptable to filtration end uses such as: tobacco smoke filters, industrial filters for air, adsorbants or absorbants, and filters for selected organic compounds.

To aid in the understanding of the present invention, reference will be made to the following drawings which form a part of the specification.

The invention is further illustrated by the following examples wherein all parts and percentages are by weight and all temperatures are in degrees centigrade, unless otherwise specified.

EXAMPLE I

A dope formulation containing fiber grade cellulose acetate having an acetyl value of about 55 was prepared according to the following formulation:

|  | Parts by weight |
|---|---|
| Cellulose acetate flake | 90.5 |
| Acetone | 1080.0 |
| Water | 120.0 |

Figure 1:
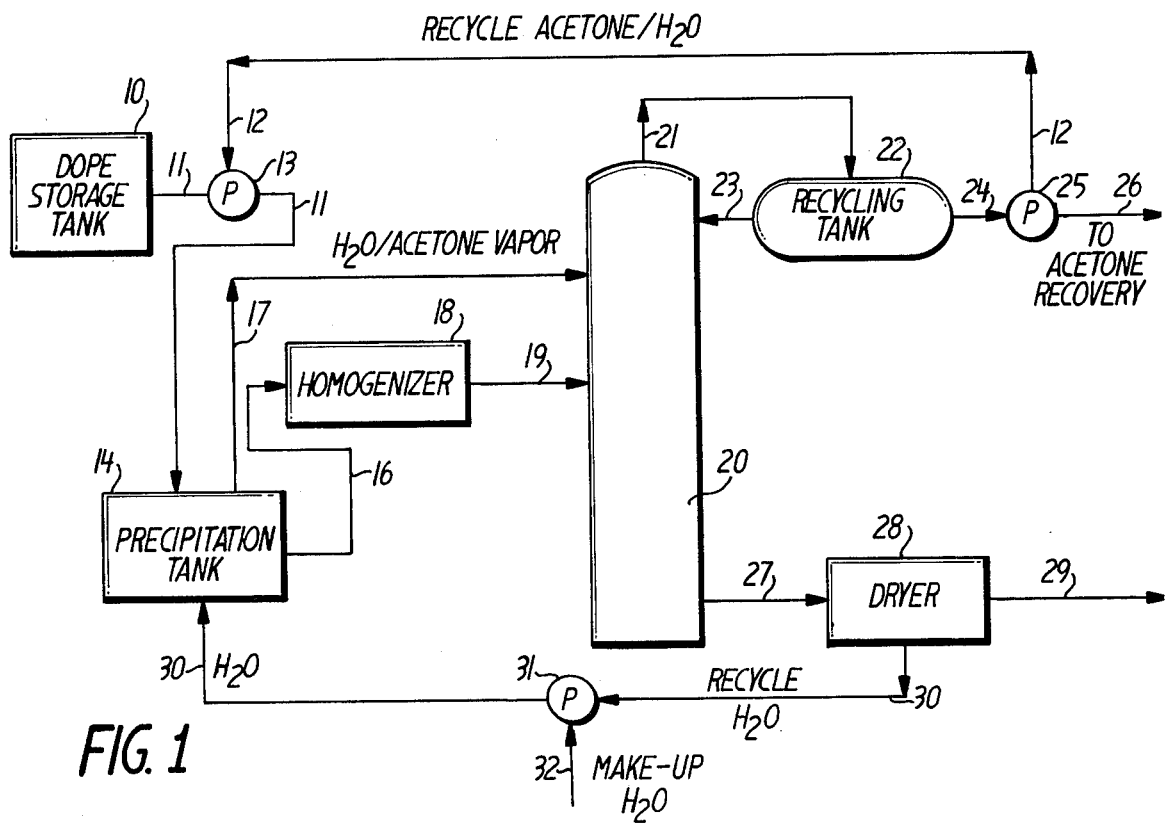
FIG. 1 is a schematic drawing of the fibret-producing process of the present invention.
Figure 2:
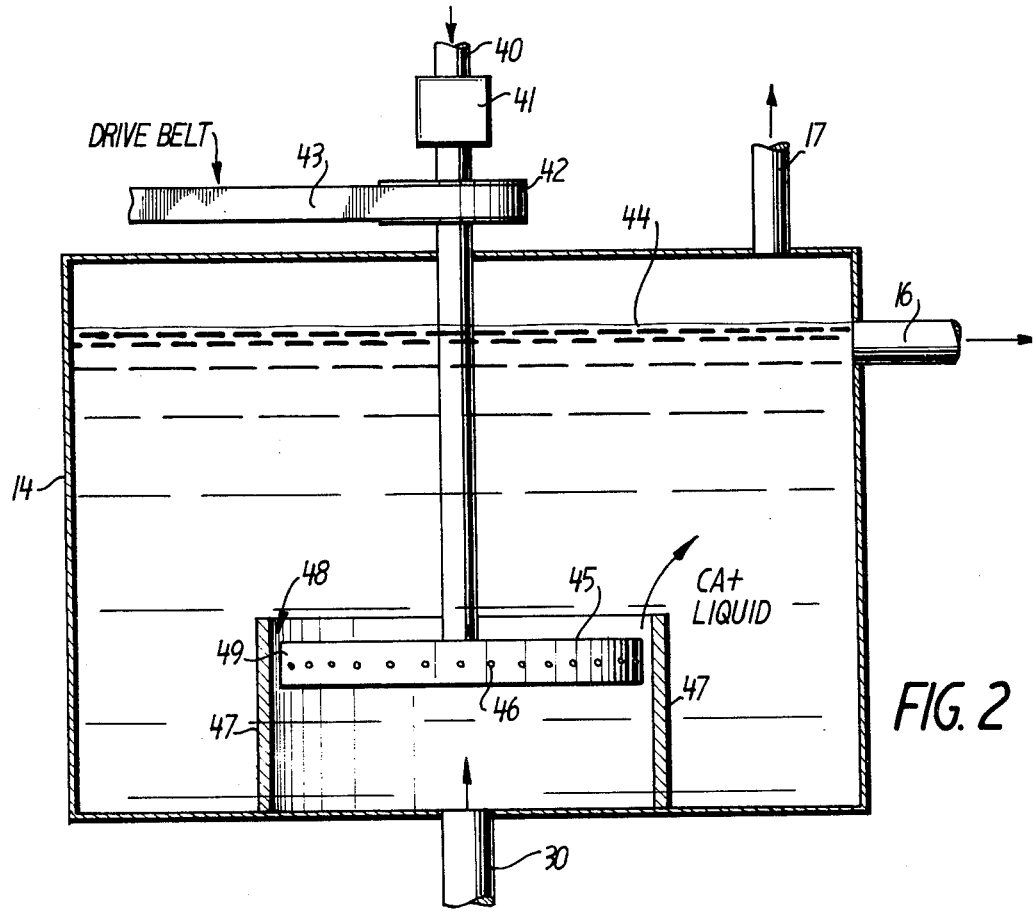
FIG. 2 is a schematic drawing of the preferred extrusion and precipitation process and apparatus of the present invention.

The acetone/water mixture was first formed by mixing, the cellulose acetate flake was added and the mixture gently tumbled until the cellulose acetate was completely dissolved. The process and apparatus utilized will be described with the aid of FIGS. 1 and 2.

The dope formulation was placed in dope storage tank 10 and was then pumped through conduit 11 by gear pump 13 to hollow shaft 40 through rotary union 41 into the interior of 6-inch hollow disk 45 rotating at 2900 revolutions per minute (a peripheral speed of 1390 meters per minute). The shaft of the disk was driven by drive belt 43 rotating pulley 42 attached to shaft 40. The disk was immersed in precipitation bath 44 which consisted essentially of water heated to a temperature between 75° and 85° centigrade. As indicated in Table I, which follows, the hollow rotating disk had three 0.014 inch diameter orifices, shown at 46 on the peripheral surface 49 of the disk 45 and in another instance had nine 0.014 inch orifices positioned on the periphery of the disk. The disk rotated within an annular wall or ring 47 spaced about 0.1875 inch from its peripheral surface 49. Water maintained at a temperature between 75° and 85° centigrade was pumped into the precipitation tank 14 through conduit 30 and then passed through annular space (annulus) 48 at the flow rates indicated in the table. Short, voidy fibers having a high degree of fibrillation were generated by the rapid precipitation of the cellulose acetate and the shear and high draw on the dope stream issuing from the extrusion orifices.

To demonstrate that the precipitation is occurring under conditions of relatively low shear and sufficiently high draw to rupture the filaments, it is helpful to consult the teaching of Morgan in U.S. Pat. No. 2,999,788. From the dope flow rate and the orifice size, it can be calculated that the radial velocity of the dope stream in Example I is 1180 centimeters per second. The rotational velocity of the disk is 2310 centimeters per second, while the rotational velocity of the water stream flowing past the periphery of the disk is 14 centimeters per second at most. All three velocity vectors are mutually orthogonal to each other. Given these conditions, the draw on the dope filament will be 1.96 and the resultant velocity vector will be directed at an angle of 63° away from the axis of the orifice, which is sufficient to rupture the filament.

In the Morgan patent a procedure for the determination of the precipitation number $P'_A$, which is the product of the shear rate on the polymer filaments and the precipitation time, is given. From the geometry of the procedure, the precipitant shear can be taken as the linear velocity gradient in the annular space between the rotating disk and the stationary annular wall. With a peripheral velocity of 1390 meters per minute and an annular spacing of 0.1875 inch, the precipitant shear rate is 4,875 seconds$^{-1}$. By equating the shear stress at the interface of the dope stream and the precipitating bath, and utilizing the viscosity values of 0.0038 and 5 poise for the precipitating bath and dope solution, respectively, the dope shear rate is calculated to be 3.7 seconds$^{-1}$ which is quite low. From titrations of the dope solution with water, it is found that the polymer precipitates at 35 volume percent, while the initial solution contained 11.2 volume percent water. Following Morgan's calculation, using a diffusion distance of 0.1 microns and a literature diffusion coefficient of $2.6 \times 10^{-5}$ square centimeters per second, the precipitation time is calculated to be 2.5 microseconds. The precipitation number is then 9.25, which is well below the region specified for the products described by Morgan.

The material, after precipitation, was then swept by and floated in the water stream to the surface of the precipitation bath and overflowed through conduit 16 onto a collection screen (not shown) where a portion of the water and acetone was separated from the fibrillar material. A substantial portion of the acetone solvent evaporated from the precipitation tank through conduit 17, as well as evaporating on the collection screen. The collected fibrillar material was redispersed in water and passed through conduit 16 to homogenizer 18, wherein it was subjected to a homogenizing action to reduce the fiber lengths to about 300 microns or less. The material was then passed through conduit 19 to boiler 20 wherein the material was boiled for about 20 minutes at a pressure of 15 PSIG to remove residual solvents through conduit 21 and harden the voidy structure. A portion of the residual solvent was recycled through tank 22 and back to the boiler through conduit 23. The residual solvent was passed through conduit 24 and pump 25, and then either through conduit 26 to acetone recovery or through conduit 12 for solvent recycling. The fibrillar material was then suction-filtered in dryer 28 to provide a filter cake containing about 10 percent by weight cellulose acetate and about 90 percent by weight water, which filter cake was transferred to storage through conduit 29. The water removed was recycled through conduit 30 and pump 31 to precipitation tank 14. Any additional water which was needed was added to conduit 30 through conduit 32 and pump 31.

The cellulose acetate fibrets produced, just after removal from the precipitation bath, have a structure which is relatively limp with a relatively short average fiber length. The fibrets, after homogenization and heat treatment, have a fibrous structure which is not limp, but rather is set and the fibrets are somewhat expanded because of the development of voids in the structure. The average fiber length is also much shorter, e.g. an average fiber length of from about 100 to 300 microns.

The filtered fibrets were redispersed and mixed with IP Hawksbury 1162 wood pulp, which has been beaten to a Canadian Standard Freeness of 120, and was formed into paper on a Noble and Woods laboratory hand sheet apparatus. The opacity was measured by ASTM Method D 589-65 using a Gardiner Automatic Color Difference Meter (Model AC-2A, Series 200) using a white and a black velvet background as backing standards. The measured opacity indices were corrected to a common sheet weight of 0.5 grams per 100 square centimeters (basis weight of 33.8 pounds per 25 × 38 inch ream). Subsequently, the paper sheets were extracted on a Soxhlet Apparatus, with acetone, to determine the concentration of cellulose acetate in the paper sheets. Control sheets containing only wood pulp and a paper grade titanium dioxide were prepared in the same manner and similarly measured to provide comparative data. The pertinent date are set forth in the following table:

TABLE I

| FILLER | NO. OF SPINNING ORIFICES | WATER TEMP. | WATERFLOW RATE (L/MIN. /ORIFICE) | SHEET WT. (GM/100 CM$^2$) | PERCENT FILLER | OPACITY INDEX (.5 GM/2 100 CM SHEET) |
|---|---|---|---|---|---|---|
| None | 0 | — | — | 0.461 | 0 | 79.3 |
| Cellulose Acetate | 3 | 75 | 6.67 | 0.501 | 7.3 | 84.5 |
| Same | 3 | 75 | 6.67 | 0.497 | 7.3 | 84.3 |
| Same | 3 | 75 | 6.67 | 0.490 | 15.9 | 88.4 |
| Same | 3 | 75 | 6.67 | 0.473 | 17.1 | 88.7 |
| Same | 9 | 80–82.5 | 1.67 | 0.495 | 10.5 | 86.5 |
| Same | 9 | 80–82.5 | 1.67 | 0.476 | 11.3 | 86.9 |
| Same | 9 | 80–82.5 | 1.67 | 0.488 | 21.7 | 90.4 |
| Same | 9 | 80–82.5 | 1.67 | 0.488 | 22.0 | 90.8 |
| TiO$_2$ | — | — | — | 0.476 | 7.1 | 84.6 |
| TiO$_2$ | — | — | — | 0.480 | 8.1 | 84.5 |
| TiO$_2$ | — | — | — | 0.470 | 10.1 | 86.5 |

EXAMPLE II

Dope formulations containing 6, 7 and 8 percent by weight cellulose acetate were prepared according to the method set forth in Example I and were extruded as in Example I from a hollow disk having three 0.009 inch orifices on its periphery into a water precipitation bath maintained at a temperature of 78° to 90° centigrade. The flow rate of the water into the bath and through the annulus between the periphery of the disk and the annular wall surrounding the disk was 6.67 liters per minute per orifice, and the annulus was 0.1875 inch in width. The fibrous material prepared in this manner was homogenized, boiled and incorporated as an additive in paper sheets as described in Example I. The pertinent data are set forth in the following table:

TABLE II

| FILLER | SPINNING SOLUTION CONCENTRATION (%) | SHEET WEIGHT (GM./100 SQ. CM.) | PERCENT FILLER | OPACITY INDEX (.5 GM./100 SQ. CM. SHEET) |
|---|---|---|---|---|
| None | None | 0.458 | None | 79.4 |
| Cellulose Acetate | 6 | 0.512 | 11.7 | 85.9 |
| Same | 6 | 0.522 | 11.9 | 86.3 |
| Same | 6 | 0.512 | 23.2 | 90.1 |
| Same | 6 | 0.503 | 23.3 | 90.3 |
| Same | 7 | 0.509 | 12.0 | 85.6 |
| Same | 7 | 0.494 | 12.0 | 85.6 |
| Same | 7 | 0.514 | 23.0 | 89.9 |
| Same | 7 | 0.468 | 23.7 | 89.3 |
| Same | 8 | 0.506 | 11.5 | 84.6 |
| Cellulose Acetate | 8 | 0.500 | 11.5 | 84.8 |
| Same | 8 | 0.502 | 21.8 | 89.1 |
| Same | 8 | 0.497 | 22.0 | 88.5 |

EXAMPLE III

Dope formulations containing cellulose acetate in the concentrations set forth in the following table were extruded as in Example I from three-orifice hollow disks with orifice sizes as indicated in the table, having diameters from 0.009 to 0.020 inch. The fibrous materials produced were treated and tested in the same manner as set forth in Example I. The pertinent data are set forth in the following table:

TABLE III

| FILLER | EXTRUSION ORIFICE SIZE (inches) | DOPE CONCENTRATION (WT. %) | SHEET WT. (GM./100 CM.²) | PERCENT FILLER | OPACITY INDEX (.5 GM./100 SQ. CM. SHEET) |
|---|---|---|---|---|---|
| None | None | None | 0.488 | 0 | 79.6 |
| Cellulose Acetate | 0.009 | 7 | 0.509 | 12.0 | 85.6 |
| Same | 0.009 | 7 | 0.494 | 12.0 | 85.6 |
| Same | 0.009 | 7 | 0.514 | 23.0 | 89.9 |
| Same | 0.009 | 7 | 0.468 | 23.7 | 89.3 |
| Same | 0.011 | 7 | 0.485 | 11.0 | 86.9 |
| Same | 0.011 | 7 | 0.490 | 11.6 | 86.5 |
| Same | 0.011 | 7 | 0.485 | 21.1 | 92.5 |
| Same | 0.011 | 7 | 0.489 | 23.5 | 90.8 |
| Same | 0.014 | 7 | 0.478 | 9.3 | 84.3 |
| Cellulose Acetate | 0.014 | 7 | 0.484 | 9.4 | 84.6 |
| Same | 0.014 | 7 | 0.482 | 19.7 | 88.4 |
| Same | 0.014 | 7 | 0.480 | 20.3 | 88.2 |
| Same | 0.020 | 7 | 0.490 | 9.2 | 84.3 |
| Same | 0.020 | 7 | 0.498 | 9.6 | 84.5 |
| Same | 0.020 | 7 | 0.492 | 19.7 | 87.0 |
| Same | 0.020 | 7 | 0.490 | 20.3 | 88.2 |
| Same | 0.020 | 9 | 0.503 | 10.5 | 84.3 |
| Same | 0.020 | 9 | 0.503 | 10.6 | 83.9 |
| Same | 0.020 | 9 | 0.512 | 21.1 | 86.9 |
| Same | 0.020 | 9 | 0.511 | 21.7 | 87.4 |
| Same | 0.020 | 11 | 0.478 | 11.5 | 83.9 |
| Same | 0.020 | 11 | 0.470 | 12.3 | 83.7 |
| Same | 0.020 | 11 | 0.513 | 22.4 | 86.9 |
| Same | 0.020 | 11 | 0.490 | 23.3 | 86.9 |
| Same | 0.020 | 13 | 0.467 | 10.6 | 83.0 |
| Same | 0.020 | 13 | 0.455 | 11.0 | 83.2 |
| Same | 0.020 | 13 | 0.469 | 22.8 | 84.6 |
| Same | 0.020 | 13 | 0.485 | 23.7 | 85.9 |

It is evident from the data that increasing the orifice size has relatively little effect on the opacification properties of the fibrillar material, although very small and very large orifices produce a less satisfactory material. Increasing the dope solids again appears to decrease opacification.

EXAMPLE IV

Figure 3:
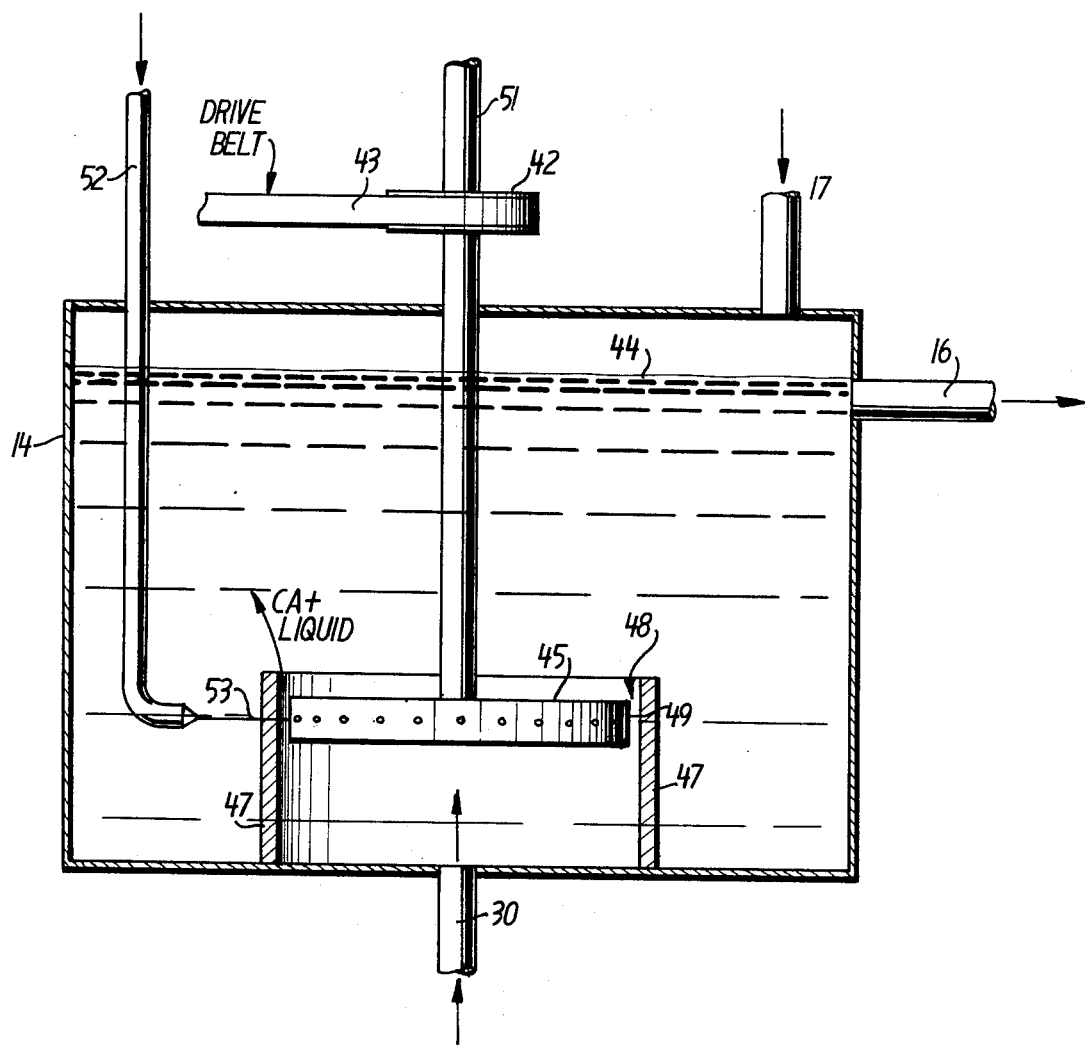
FIG. 3 is a schematic drawing of an alternative extrusion and precipitation process and apparatus of the present invention.

The dope formulation of Example I was extruded, as shown in FIG. 3, from a capillary needle 53 positioned on the annular wall 47 surrounding the rotating disk 45 which had a peripheral speed of about 1290 meters per minute. The shaft 51 was driven by drive belt 43 rotating pulley 42 attached to the shaft. The remainder of the process and apparatus utilized was identical with that of Example I.

The final fibrillar product was rough surfaced, voidy, fibrillar and opaque and was substantially identical in appearance to the product produced under the same conditions in Example I.

EXAMPLE V

To illustrate the effect of rotational and dope velocities on the opacity of paper sheets containing the fibrets produced according to the present invention, the dope formulation of Example I was extruded from a nine-0.014 inch orifice hollow disk at peripheral rotational velocities and dope exit velocities as listed in Table IV below. The material thus prepared was incorporated into paper sheets and opacities measured, as in Example I. The opacity index at a 15 percent by weight concentration of cellulose acetate fibrets was obtained by interpolation of nearly linear plots of opacity indices as a function of the square root of the cellulose acetate concentration. A draw ratio was computed by dividing the resultant velocity vector of the dope filament by the orifice exit velocity of the dope, and the resultant velocity angle vector was computed from the ratio of the rotational and dope exit velocities. The pertinent data are listed in the following table:

TABLE IV

| PERIPHERAL ROTATION VELOCITY (CM./SEC) | DOPE EXIT VELOCITY (CM./SEC.) | DRAW RATIO | VELOCITY VECTOR ANGLE (DEGREES) | OPACITY INDEX(.5 GM./100 sq. CM. SHEET) |
|---|---|---|---|---|
| 2150 | 280 | 7.75 | 83 | 88.5 |
| 2150 | 821 | 2.80 | 69 | 88.5 |
| 2150 | 821 | 2.80 | 69 | 87.9 |
| 2150 | 1355 | 1.88 | 58 | 87.7 |
| 2150 | 1355 | 1.88 | 58 | 87.4 |
| 2150 | 1850 | 1.54 | 49 | 87.7 |
| 2150 | 1850 | 1.54 | 49 | 87.5 |
| 1612 | 280 | 5.76 | 80 | 87.1 |
| 1612 | 821 | 2.21 | 63 | 86.7 |
| 1612 | 1355 | 1.56 | 50 | 86.8 |
| 1612 | 1850 | 1.32 | 41 | 85.9 (1) |
| 1075 | 280 | 3.97 | 75 | 87.1 |
| 1075 | 821 | 1.64 | 53 | 87.0 |

TABLE IV-continued

| PERIPHERAL ROTATION VELOCITY (CM./SEC) | DOPE EXIT VELOCITY (CM./SEC.) | DRAW RATIO | VELOCITY VECTOR ANGLE (DEGREES) | OPACITY INDEX(.5 GM./100 sq. CM. SHEET) |
|---|---|---|---|---|
| 1075 | 821 | 1.64 | 53 | 86.3 |
| 1075 | 1355 | 1.28 | 39 | 86.4 (1) |
| 1075 | 1355 | 1.28 | 39 | 85.4 (1) |
| 1075 | 1850 | 1.16 | 30 | 85.4 (1) |
| 1075 | 1850 | 1.16 | 30 | —(2) |

(1) Some material deposited as a gel-like structure on the outer ring of the precipitation zone, and eventually interfered with the formation of the fibrets.
(2) The precipitation zone filled rapidly with a gel-like precipitate which prevented the formation of the fibrets.

From Table IV, it is evident that fibrets formed at higher rotational velocities and at the higher draw ratios and vector angles exhibit higher and more desirable opacification properties. At draw ratios of less than 1.35 and vector angles of less than 45°, deposition of gel-like precipitates occurs, which eventually fills the precipitation zone, thereby stopping the formation of fibrets, and the fibrets formed prior to this are markedly inferior in their opacification properties. As the draw ratio is increased to 2 or more, shorter fiber lengths and better opacification properties are achieved, although the rate of improvement in these properties decreases with increasing draw ratio and tends to become smaller at draw ratios above about 3. Opacity appears to be an essentially linear function of the vector angle, and angles of at least 50° are to be preferred.

Various changes may be made in the foregoing examples specifically set forth without departing from the spirit of the present invention or the scope of the appended claims.

The embodiments of the invention in which an exclusive property or privilege are claimed are defined as follows;

1. An apparatus for the production of an opaque, voidy fibrillar structure which comprises a precipitation tank containing a precipitation bath; a substantially cylindrical disk positioned within said tank and submerged in said bath; means for rotating said disk in said bath at a peripheral speed of at least 500 meters per minute; a stationary annular wall spaced from said disc's peripheral surface by 1/16 to ¼ inch; one or more orifices positioned about the periphery of said disk; means for pumping additional precipitation bath into said precipitation bath and past the periphery of said disk at a flow rate of at least 0.5 liter per minute per extrusion orifice; means for removing the precipitated fibrillar structure from said bath; and means for homogenizing said fibrillar structure.

2. The apparatus of claim 1 wherein said means for rotating said disc is capable of rotating said disc at a peripheral speed of from 1200 to 1800 meters per minute.

3. The apparatus of claim 1 wherein one or more extrusion orifices are positioned on the periphery of said disk.

4. The apparatus of claim 1 wherein one or more extrusion orifices are positioned on said annular wall.

5. The apparatus of claim 1 wherein the rotating disk is substantially hollow and includes means for pumping the dope into the interior of said hollow disk.

* * * * *